(12) United States Patent
Hobe et al.

(10) Patent No.: US 8,087,439 B2
(45) Date of Patent: Jan. 3, 2012

(54) WHEEL WITH INTEGRATED AND NON-INTEGRATED CENTRAL TIRE INFLATION

(75) Inventors: Peter K. Hobe, Levittown, PA (US); Olivier Noblanc, Philadelphia, PA (US)

(73) Assignee: Hutchinson, S.A., Paris (FR)

( * ) Notice: Subject to any disclaimer, the term of this patent is extended or adjusted under 35 U.S.C. 154(b) by 55 days.

(21) Appl. No.: 12/456,251

(22) Filed: Jun. 12, 2009

(65) Prior Publication Data

US 2010/0024940 A1 Feb. 4, 2010

Related U.S. Application Data

(60) Provisional application No. 61/131,976, filed on Jun. 13, 2008.

(51) Int. Cl.
*B60C 29/02* (2006.01)
(52) U.S. Cl. ........................................ 152/418; 152/416
(58) Field of Classification Search .................. 152/415, 152/416, 417, 418, 419, 427, 428
See application file for complete search history.

(56) References Cited

U.S. PATENT DOCUMENTS

| 4,440,451 | A | * | 4/1984 | Goodell et al. ............ 301/105.1 |
| 4,705,090 | A | * | 11/1987 | Bartos ............................ 152/417 |
| 5,221,381 | A | * | 6/1993 | Hurrell, II ...................... 152/416 |
| 6,474,383 | B1 | * | 11/2002 | Howald et al. ................. 152/418 |
| 7,168,468 | B2 | * | 1/2007 | Wang et al. .................... 152/427 |
| 7,451,794 | B1 | * | 11/2008 | Baird et al. .................... 152/405 |
| 7,686,051 | B2 | * | 3/2010 | Medley et al. ................. 152/428 |
| 2008/0149243 | A1 | * | 6/2008 | Resare et al. .................. 152/415 |
| 2009/0205764 | A1 | * | 8/2009 | Pionke ............................ 152/427 |
| 2009/0266460 | A1 | * | 10/2009 | Resare et al. .................. 152/417 |

* cited by examiner

*Primary Examiner* — Kip Kotter
(74) *Attorney, Agent, or Firm* — Reed Smith LLP

(57) ABSTRACT

This wheel has features allowing both integrated and non-integrated Central Tire Inflation (CTI) systems to be installed, without the need for a specialized manifold, adapter, or unique wheel to accommodate each specific system. Thus, a single, light-weight wheel in accordance with this invention can accept either non-integrated or integrated CTI valves, allowing the wheels of the invention to be used on newer vehicles with integrated CTI systems, as well as on older vehicles with non-integrated (external) CTI systems. In addition, a wheel with both integrated and non-integrated Central Tire Inflation (CTI) systems is much simpler to assemble since the valve mounts directly to the wheel and no brackets are required, unlike prior two-piece bolt-together wheels.

20 Claims, 11 Drawing Sheets

(SECTION C-C)

(SECTION F-F)

(SECTION C-C)

(SECTION F-F)

(SECTION B-B)

(SECTION A-A)

WHEEL WITH INTEGRATED AND NON-INTEGRATED CENTRAL TIRE INFLATION

This application claims an invention which was disclosed in a provisional application filed Jun. 13, 2008; Ser. No. 61/131,976 entitled "WHEEL WITH INTEGRATED AND NON-INTEGRATED CENTRAL TIRE INFLATION". The benefit under 35 USC 119(e) of the United States provisional application is hereby claimed, and the aforementioned application is hereby incorporated herein by reference.

BACKGROUND AND SUMMARY

This invention pertains generally to Central Tire Inflation (CTI) systems. CTI systems are installed in many military vehicles as they enable tire pressure to be lowered as needed to enable the user to benefit from the increased traction available while operating at low tire pressure. CTI systems can be integrated or non-integrated and are typically used with multi-piece wheels in conjunction with beadlock or runflat devices. Prior art multi-piece wheel designs for use with non-integrated and integrated CTI systems fall into three major categories.

A first major category of multi-piece wheel designs includes wheels with features adapted for use with a non-integrated CTI having only external air passages. This type of wheel accepts a non-integrated CTI valve (or valves), and all air passages are external to the wheel (i.e. hoses and/or tubing). The CTI valve is typically fastened to brackets that are attached to the wheel. The wheel is usually a multi-piece wheel (two-piece bolt-together, or two or more piece wheel comprising a useful base, side rim, and lock-ring).

A second category would include wheels with features adapted for use with a non-integrated CTI with both internal and external air passages. This type of wheel accepts a non-integrated CTI valve (or valves), and some of the air passages are internal to the wheel, with the balance requiring external hoses and/or tubing. The CTI valve is fastened directly to the wheel, or fastened to brackets that attach to the wheel. The wheel is, once again, usually a multi-piece wheel (two-piece bolt-together, or two or more piece wheel comprising a useful base, side rim, and lock-ring).

A third category includes wheels including features adapted for use with an integrated CTI having only internal air passages. This type of wheel accepts an integrated CTI valve (or valves), and all air passages are internal to the wheel. The CTI valve is fastened directly to the wheel. The wheel is typically, but not necessarily, a two-piece wheel. (See, e.g., U.S. Pat. No. 6,076,578).

However, all of these prior art approaches to wheel design have disadvantages. First, prior multi-piece wheels designed for use with CTI systems only permit use of a single system, either non-integrated or integrated CTI, but not both. This limits the number of vehicle applications for the wheel to those compatible with that specific CTI system. Second, prior multi-piece wheels designed for use with CTI systems only permit use of a single system, either non-integrated or integrated CTI, but not both. This results in higher costs and additional complexity to develop, test, manufacture, and supply a wheel adapted for the CTI system of a specific vehicle. Third, multi-piece wheels constructed from steel prohibit the use of integrated CTI systems, as internal air passages cannot be made in the rim components due to the rim geometry. Fourth, multi-piece wheel designs that use fasteners to clamp the rim components together have limited space available on the wheel face for mounting integrated and non-integrated CTI valves. Fifth, multi-piece wheel designs with non-integrated CTI valves require the use of brackets to attach the CTI valve to the wheel. This moves the valve further outboard, making it more susceptible to damage. And, sixth, multi-piece wheel designs with non-integrated CTI valves require the use of brackets to attach the CTI valve to the wheel. This increases assembly time and adds to the complexity of mounting non-integrated CTI valves.

The instant invention resolves and avoids these difficulties by teaching wheel designs that allow both integrated and non-integrated Central Tire Inflation (CTI) systems to be installed on a single, light-weight wheel, without the need for a specialized manifold, adapter, or unique wheel to accommodate each specific system. The foregoing features and others of the inventive concept, as more fully described below, provide numerous advantages over the systems of prior art. To begin with, and most obviously, a wheel incorporating the teachings of our invention can accept either non-integrated or integrated CTI valves. This allows the wheels of the invention to be used on newer vehicles with integrated CTI systems, as well as on older vehicles with non-integrated (external) CTI systems. In addition, it is much simpler to assemble a non-integrated CTI valve to the wheel face since the valve mounts directly to the wheel and no brackets are required, unlike designs used with prior two-piece bolt-together wheels. Further, it is substantially less costly and complex to develop, test, manufacture, and supply a one wheel design that can be used on vehicles with different CTI systems, as opposed to multiple wheel designs. The numerous other advantages of our invention will become more apparent in view of the more detailed description and claims that follow.

DESCRIPTION

Figure 1:
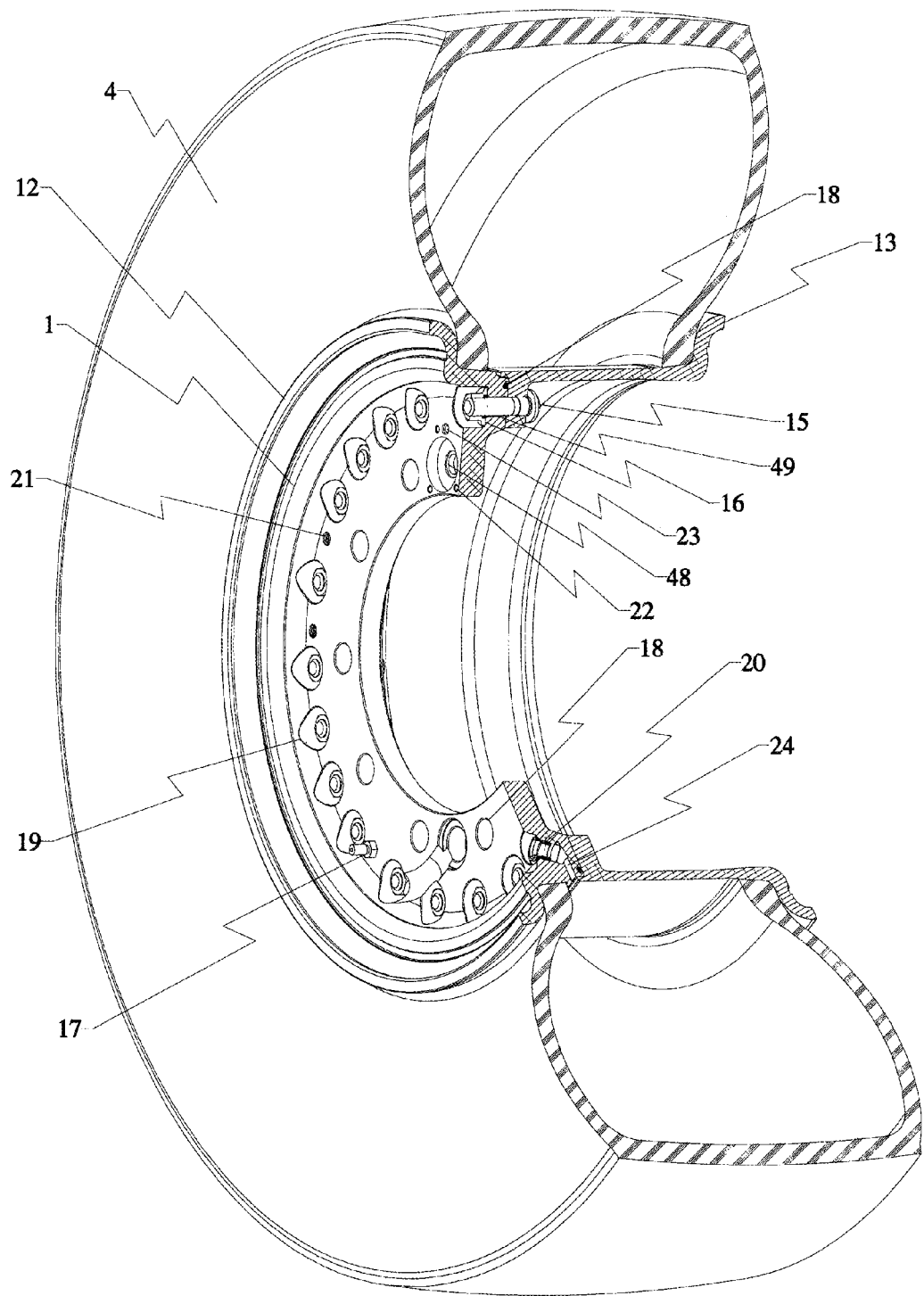
FIG. 1 provides a perspective sectional view illustrating a two-piece wheel assembly produced in accordance with the teachings of the invention prior to fitting any CTI components or plugs.
Figure 8:
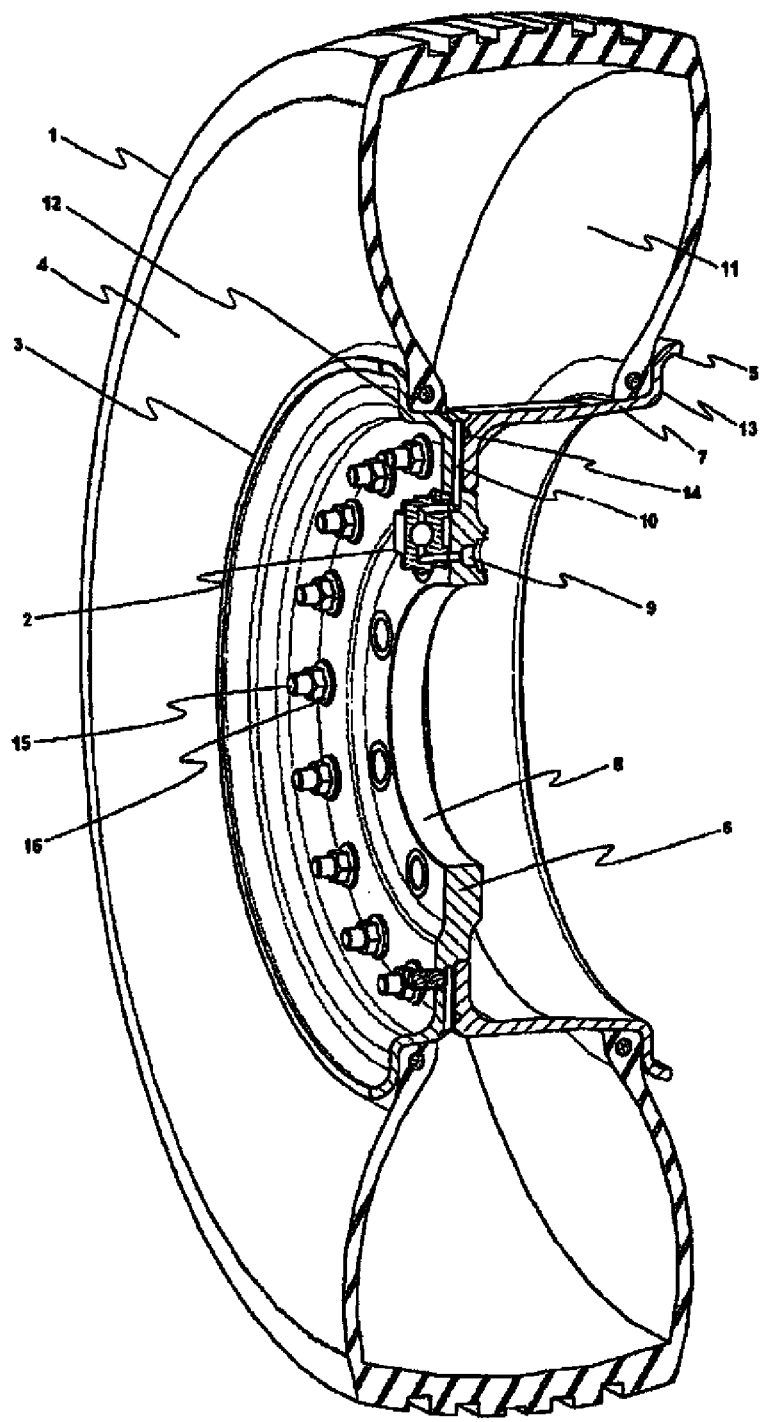
FIG. 8 provides a perspective view of a prior art two-piece wheel with CTI valve and internal air passageways.

The preferred embodiments described herein involve, and the inventive concept is described with reference to, a two-piece wheel that accepts both CTI systems, as two-piece wheels are the type of multi-piece wheel that is commonly used with CTI systems. FIG. 1 illustrates a design for a two-piece wheel assembly 1 prior to placement of any CTI components or plugs. The outer rim 12 is connected to the inner rim 13 using studs 15 and nuts 16. The studs 15 pass through openings 49 defined by the outer rim 12. A seal 14, depicted here by an O-ring, is used between the rim halves to maintain tire pressure. The outer rim 12 contains all CTI-related mounting holes 21/22 and air passages 23/24, as well as a mounting port 48 adapted to receive an integrated CTI valve mounted to the outer rim 12. The outer rim 12 has enlarged holes in the form of recessed wells 19 in the face, to permit the protruding stud 15 and nut 16 to be recessed below the face of the wheel, providing a flush mounting surface for the non-integrated (external) CTI valve 25 (not shown). A fill valve 17 is installed in the outer rim 12 that provides a means of manual inflation to bypass the CTI system, as some CTI valves may not include an integral manual fill valve. A threaded insert 20 in the outer rim 12 accepts an adapter 27 (see FIGS. 3 and 4) for the non-integrated CTI configuration, and a plug (not shown, see FIG. 5) for the integrated CTI configuration. Thus, it will be appreciated that FIG. 1 shows a circular wheel rim (e.g., two-piece wheel assembly 1) having a flaring circumferential outer flange section (e.g. outer rim 12) formed coaxially on an outer end thereof and a flaring circumferential inner flange section (e.g., inner rim 13) formed coaxially on an inner end thereof, wherein said flange sections are both disposed to be engaged by beads of a tire (e.g., tire 4) mounted on the rim, with a traverse wall section (e.g., disc portion 6 as shown in FIG. 8) intermediate said inner and outer ends extending transversely of an axis of said rim, said transverse wall section having an outer face and being adapted to connect to a vehicle wheel hub having a hub port for the passage of air. It will be further appreciated that said wheel rim has a mounting port (e.g., mounting port 48) adapted for mounting an integrated central tire inflation valve (e.g., integrate CTI valve 2).

Figure 2:
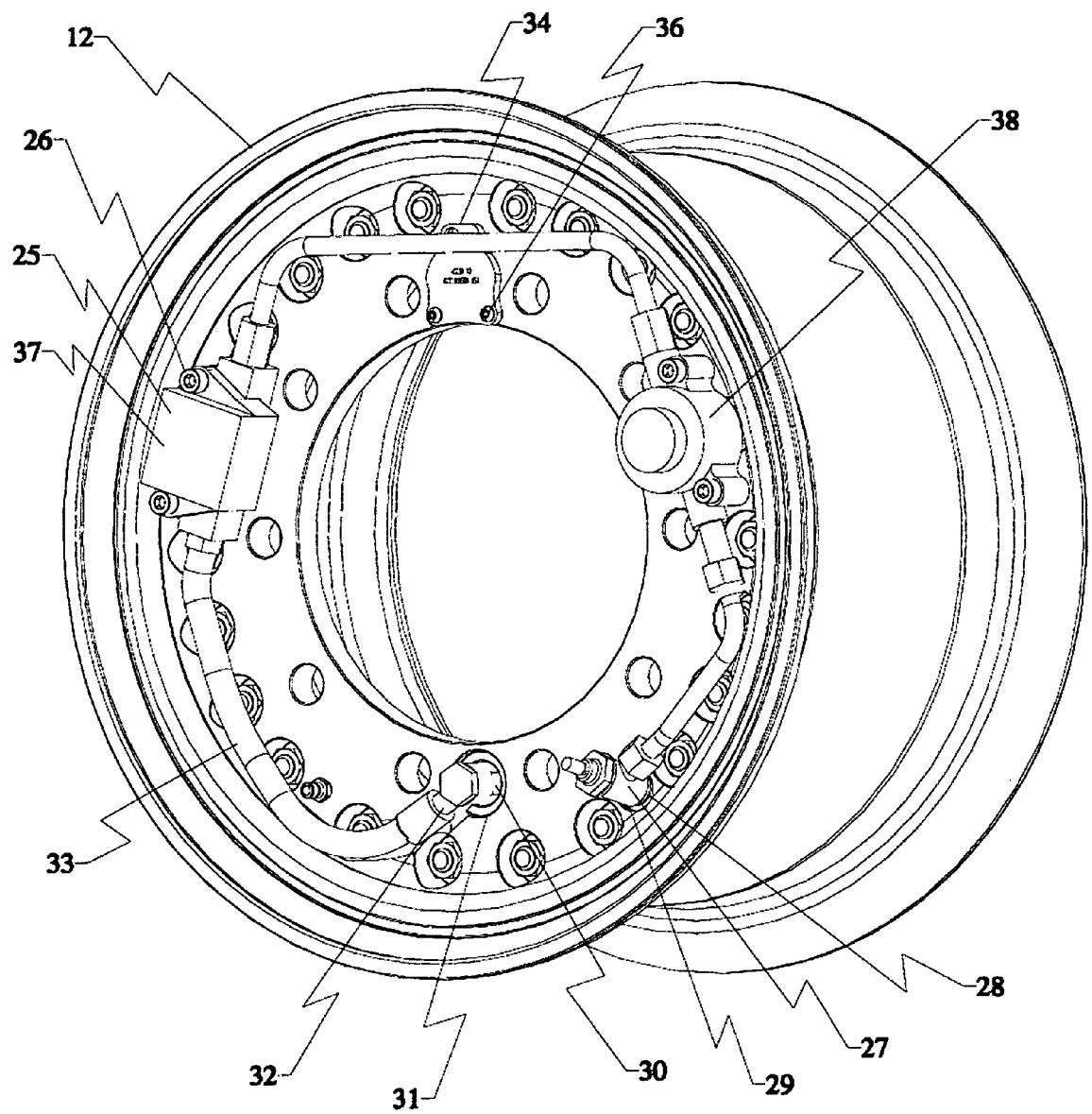
FIG. 2 provides a perspective view of the wheel of FIG. 1, illustrating the non-integrated CTI configuration of the wheel, with all air passages used by the integrated CTI system sealed.
Figure 3:
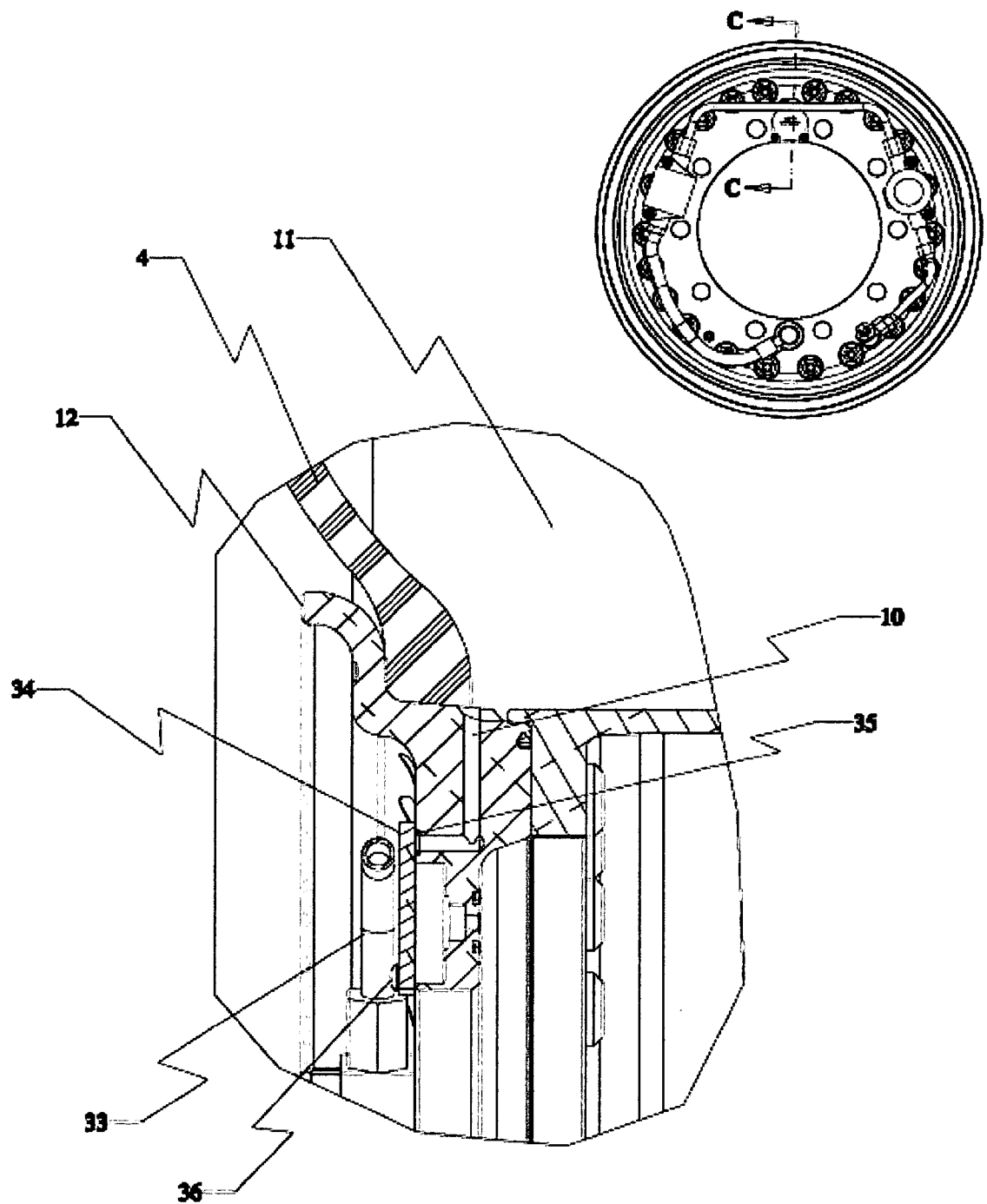
FIG. 3 provides a front elevation of the wheel of FIG. 2, with a more detailed cross-sectional view taken through C-C thereof, further illustrating the non-integrated CTI configuration of the wheel, with all air passages used by the integrated CTI system sealed.
Figure 4:
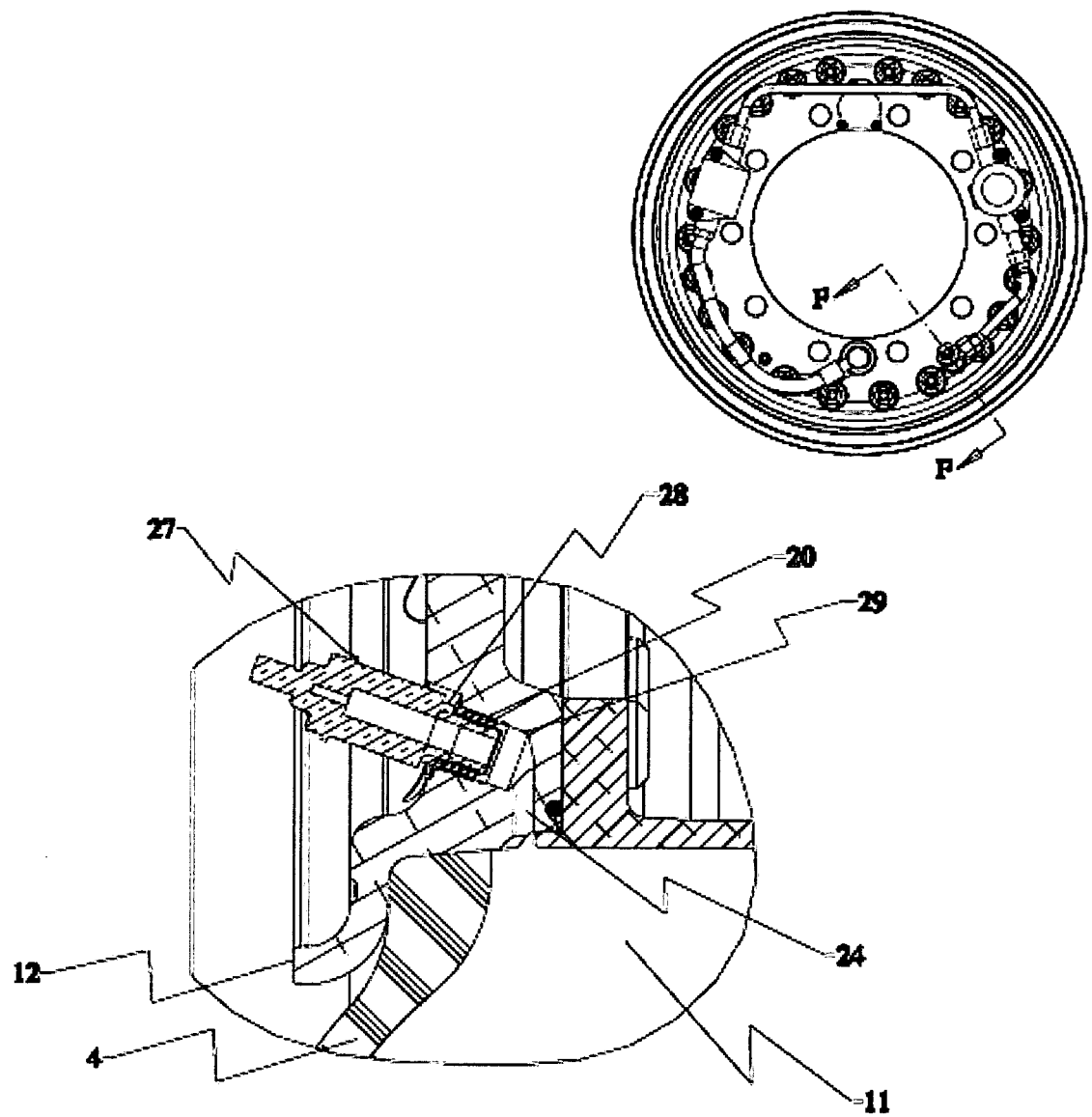
FIG. 4 provides another front elevation of the wheel of FIG. 2, with a more detailed cross-sectional view taken through F-F thereof, further illustrating the non-integrated CTI configuration of the wheel, with all air passages used by the integrated CTI system sealed.

FIGS. 2, 3 and 4 show the non-integrated CTI configuration of the wheel, with all air passages used by the integrated CTI system sealed. In terms of physical installation, the non-integrated (or external) CTI valve assembly 25 is secured to the wheel face using screws 26. The adapter 27 containing the fill valve is aligned with the port 29 in the wheel face leading to the internal air passage 24 (not shown in FIGS. 2 and 3), and a concealed fastener with sealing washer 28 secures the adapter 27 to the outer rim 12 providing a sealed connection. A fitting 30 protruding from the hub passes through a clearance hole 31 in the wheel between the lug holes. A fitting 32 connects atop the fitting protruding through the outer rim 12, connecting the air hose assembly 33 to the hub connection. A cover plate 34 with a seal 35 (not shown in FIGS. 2 and 4), depicted here by an O-ring, is placed over the integrated CTI mounting location to plug the unused integrated CTI air passage 23, and secured to the wheel face with fasteners 36 in the outer rim 12. Although the mounting port 48 is covered by the mounting plate 34 in FIG. 2, it will be appreciated that the mounting port 48 and the clearance hole 31 are located approximately 180 degrees apart on the outer rim 12.

In terms of air routing in the system of FIGS. 2, 3 and 4, air passes from the vehicle hub into the protruding fitting 30, and into a hose assembly 33. The hose assembly 33 routes the air to a quick-release valve 37, which may be absent on another external CTI systems. Air then continues through the hose assembly to the external CTI valve 38. From there, the air travels into an adapter 27 threaded into the outer rim 12. The air then travels through an internal air passage 24 in the wheel, past the beadlock or runflat device (not shown), and into the tire chamber 11 (not shown in FIG. 2). Thus, it will be appreciated that FIG. 2 shows that the wheel rim (e.g. outer rim 12) has a clearance hole (e.g., clearance hole 31) for connecting an external air passageway (e.g., air hose assembly 33) to a hub port.

Figure 5:
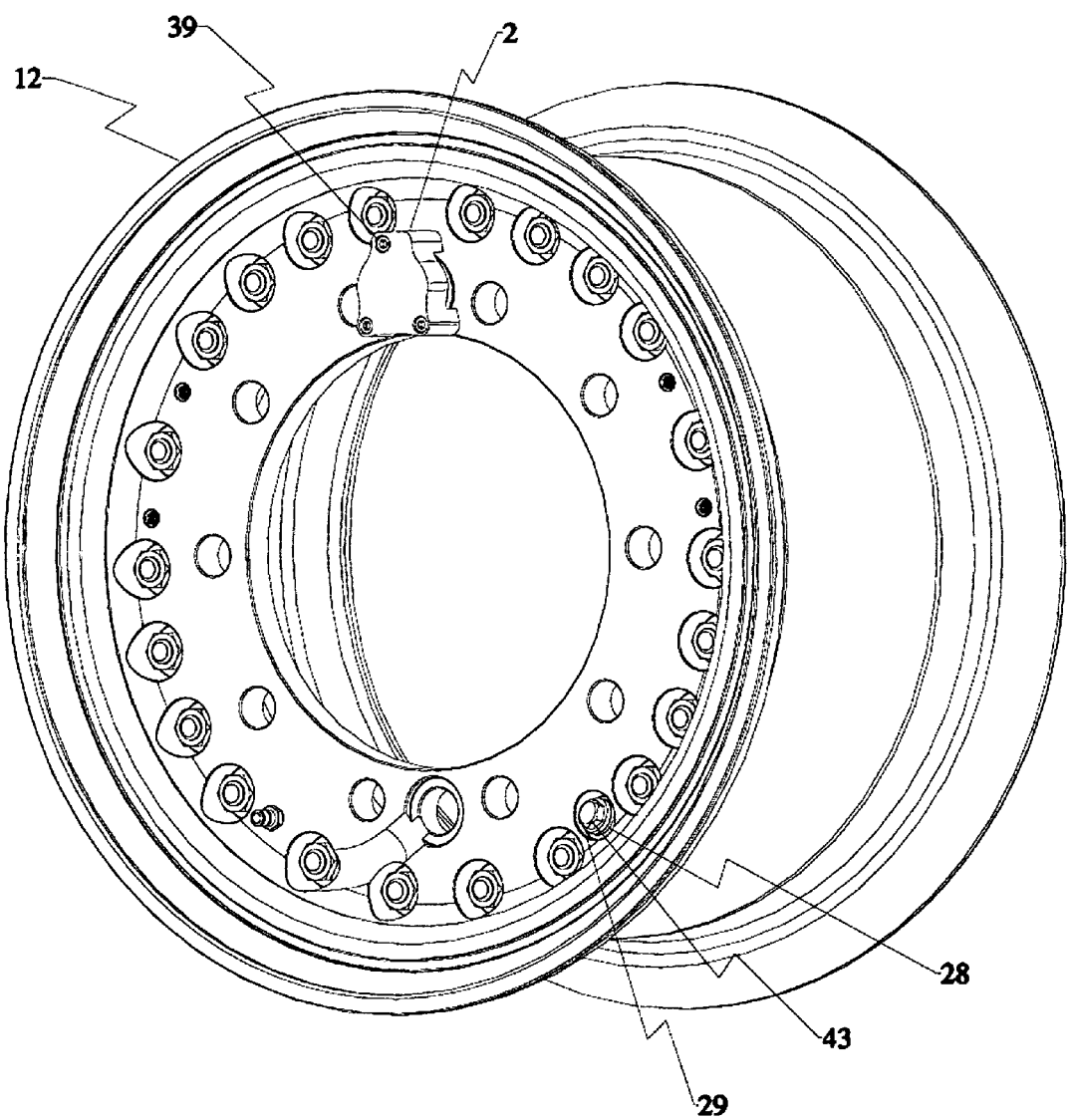
FIG. 5 provides a perspective view of the wheel of FIG. 1, illustrating the integrated CTI configuration of the wheel, with all air passages used by the non-integrated CTI system sealed.
Figure 6:
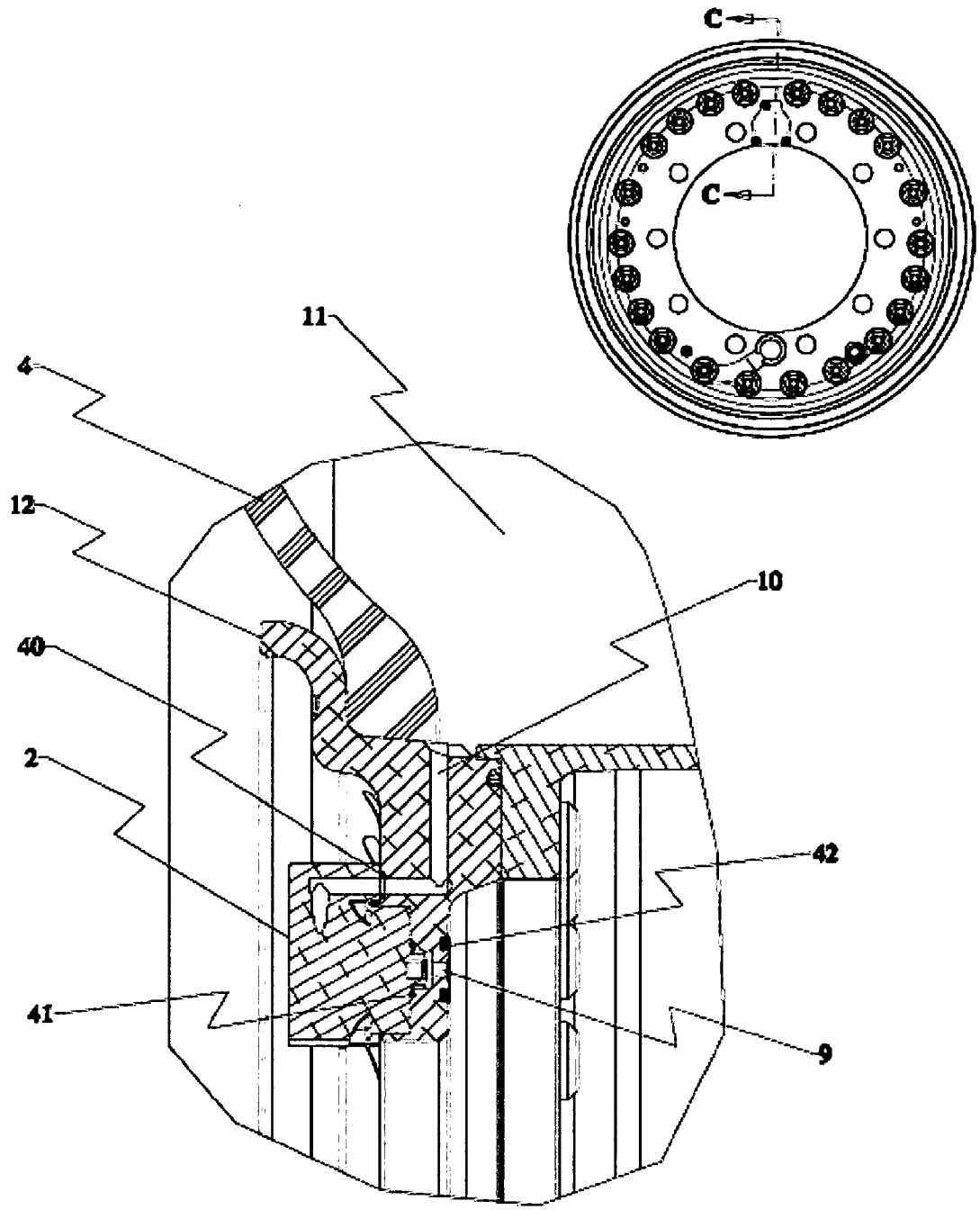
FIG. 6 provides a front elevation of the wheel of FIG. 5, with a more detailed cross-sectional view taken through C-C thereof, further illustrating the integrated CTI configuration of the wheel, with all air passages used by the non-integrated CTI system sealed.
Figure 7:
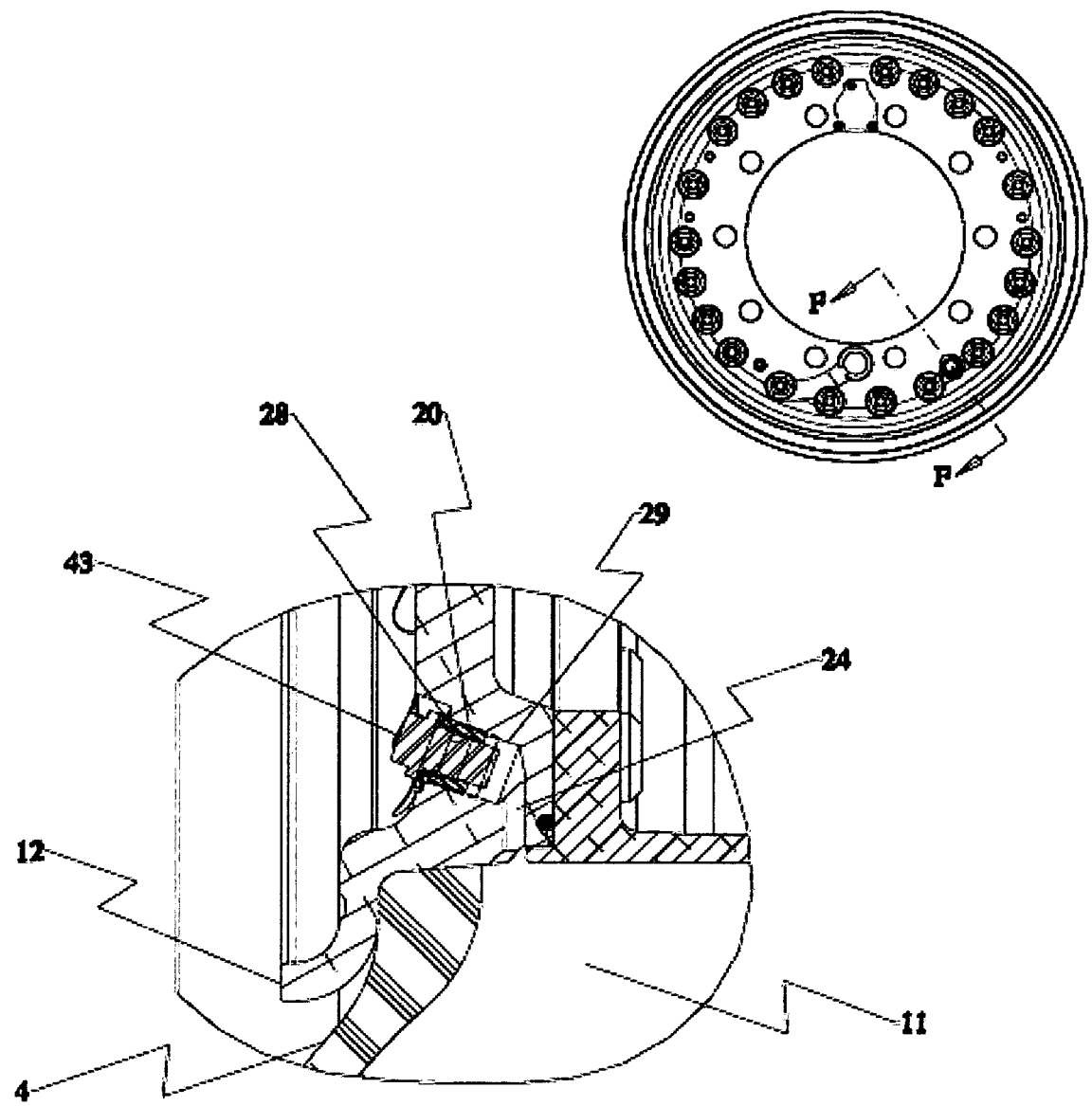
FIG. 7 provides another front elevation of the wheel of FIG. 5, with a more detailed cross-sectional view taken through F-F thereof, further illustrating the integrated CTI configuration of the wheel, with all air passages used by the non-integrated CTI system sealed.

FIGS. 5, 6, and 7 show the integrated CTI configuration of the wheel, with all air passages used by the non-integrated CTI system sealed. In terms of physical installation, the integrated CTI valve 2 is fastened to the outer rim 12 using screws 39. One seal 40 (not shown in FIGS. 5 and 7), depicted here as an O-ring, is placed on the back of the CTI valve to seal between the valve and tire air passage 10. A second seal 41 (not shown in FIGS. 5 and 7), depicted here as an O-ring, is placed on the back of the CTI valve to seal between the valve and hub air passage 9. A third seal 42 (not shown in FIGS. 5 and 7), depicted here as an O-ring, snaps into a groove on the hub mounting surface of the outer rim 12 to seal the connection between the hub and the wheel. A plug 43 is installed into an internal thread 20 in a port 29 in the outer rim 12 to prevent air leakage from the air passage 24 to the tire.

In terms of air routing in FIGS. 5, 6, and 7, air passes from the vehicle hub through the air passage 9 on the back of the outer rim 12 into the wheel. From here, it passes into the CTI valve 2 and into the air passage 10 in the wheel leading to the tire, past the beadlock or runflat device (not shown), and into the tire chamber 11 (not shown in FIG. 5). In view of the above, it will be appreciated that the drawings collectively show a wheel (e.g., wheel assembly 1) for use with integrated and non-integrated central tire inflation systems, where the wheel includes an inner rim 13 and an outer rim 12, the outer rim 12 being connected to the inner rim 12 and being configured for connection to a vehicle wheel hub having a hub port for the passage of air. It will be further appreciated that the outer rim defines the following: a first opening (e.g., mounting port 48) configured for receiving an integrated central tire inflation valve (e.g., CTI valve 2); a first internal air passageway (e.g., hub air passage 9) configured for communicating air from the vehicle wheel hub to the integrated central tire inflation valve when the outer rim is connected to the vehicle wheel hub and the integrated central tire inflation valve is mounted to the outer rim; a second internal air passageway (e.g., tire air passage 10) configured for communicating air from the integrated central tire inflation valve to an interior of a tire (e.g., tire 4) when the central tire inflation valve is mounted to the outer rim and the tire is mounted on the wheel; mounting holes (e.g., mounting holes 21) for mounting a non-integrated central tire inflation valve system (including, for example, air hose assembly/tubing 33) to the wheel; a second opening (e.g., clearance hole 31) configured for receiving a first end of the non-integrated central tire inflation valve system (e.g., a first end of the air hose assembly/tubing 33 via fittings 30 and 32), wherein the first end of the non-integrated central tire inflation valve system receives air from the vehicle hub port when the outer rim is connected to the vehicle wheel hub; a third opening (e.g., port 29) configured for receiving a second end of the non-integrated central tire inflation valve system (e.g., a second end of the air hose assembly/tubing 33 via the adapter 27); and a third internal air passageway (e.g., air passage 24) configured for communicating air from the second end of the non-integrated central tire inflation valve system to the interior of the tire when the tire is mounted on the wheel.

Figure 9:
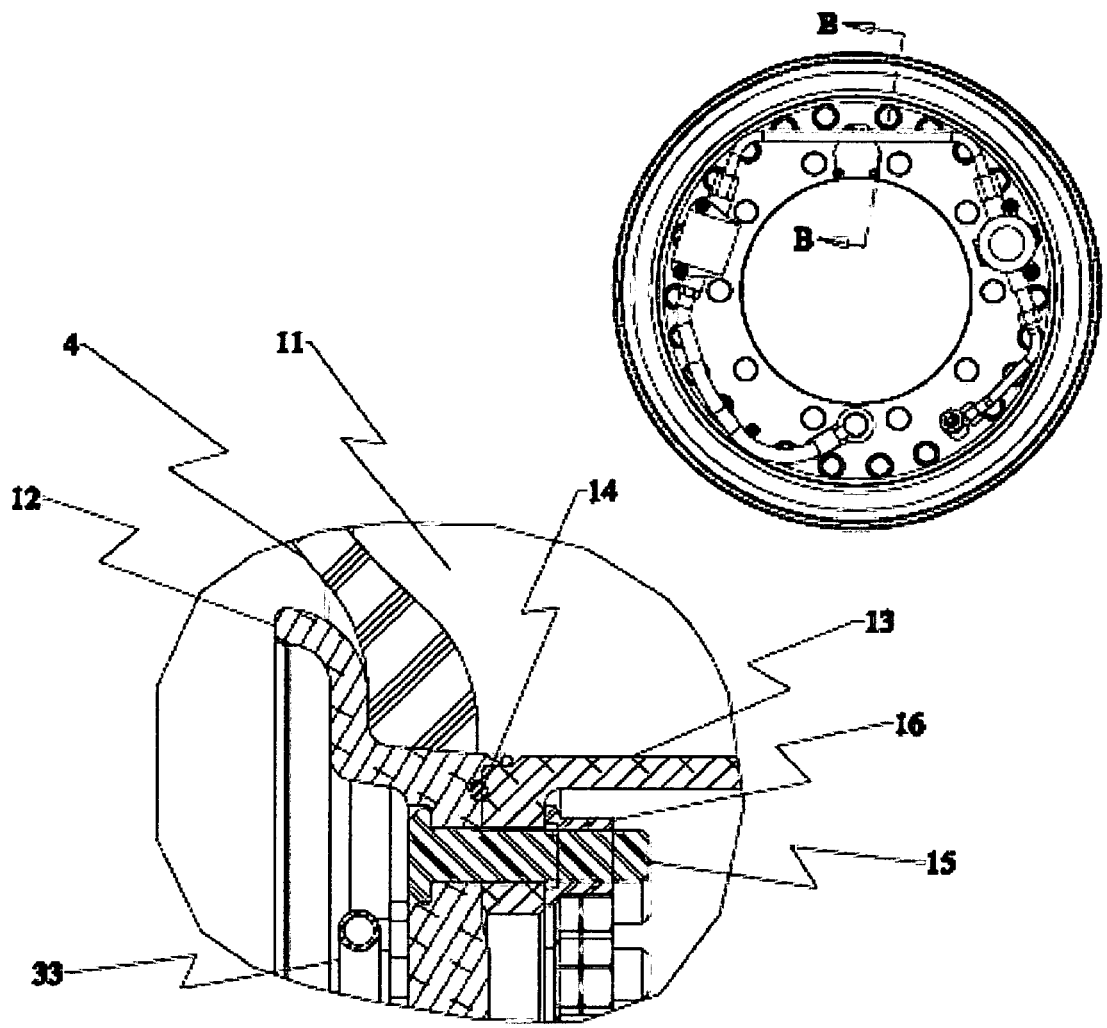
FIG. 9 provides a front elevation of the wheel of FIG. 2, with a more detailed cross-sectional view taken through B-B thereof, illustrating an alternate configuration for the bolted connection for a two-piece wheel, in which the stud and nut are reversed so that the stud is oriented inboard instead of outboard, and the nut is installed from the opposite side of the wheel.
Figure 10:
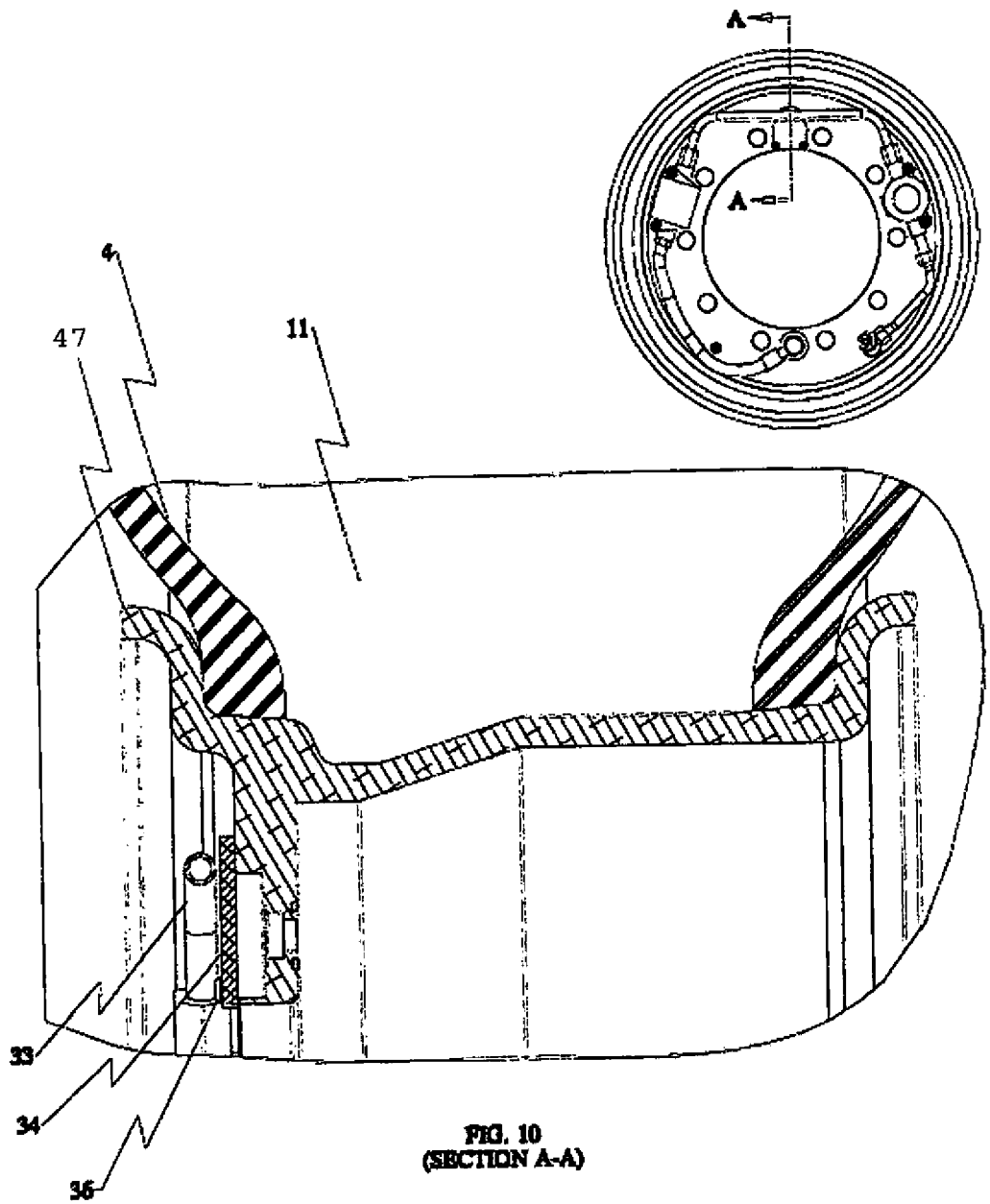
FIG. 10 provides a front elevation of a one-piece wheel, with a more detailed cross-sectional view taken through A-A thereof, illustrating the one-piece wheel with the non-integrated CTI valve, and cover plate attached to the wheel by a screw.
Figure 11:
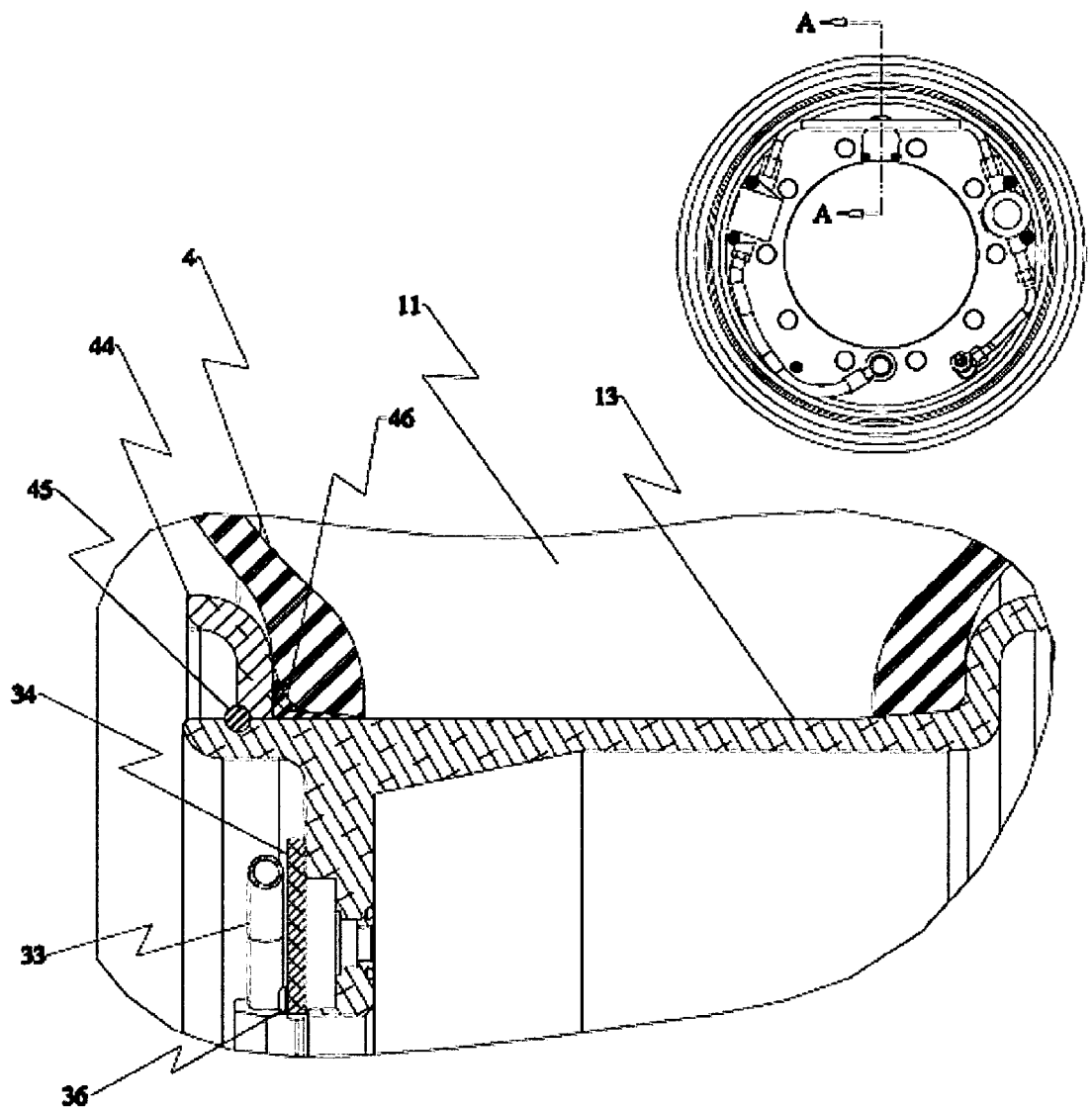
FIG. 11 provides a front elevation of a three-piece wheel including an inner rim, an outer flange, and a lock-ring, produced in accordance with the teachings of the invention, with a more detailed cross-sectional view taken through A-A thereof.

The previously described advantages and features of the invention are advantageously provided through and using the preferred embodiments previously illustrated and discussed. However, numerous variations are possible without deviating from and/or exceeding the spirit and scope of the invention. For example, even though an aluminum wheel is shown in many of the figures, it is clear that many of the methods of the invention can be extended to wheels constructed of different materials. Further, FIG. 9 illustrates an alternate configuration for the bolted connection for a two-piece wheel, in which the stud 15 and nut 16 are reversed so that the stud 15 is oriented inboard instead of outboard, and the nut 16 is installed from the opposite side of the wheel. (This configuration provides the benefit of reduced wheel weight). In addition, although a two-piece wheel is shown in many of the figures, it is clear that many of the methods of the invention can be extended to one-piece wheels, or multi-piece wheels consisting of more than two major parts. FIGS. 10 and 11 illustrate a one-piece and three-piece configuration, respectively. FIG. 10 illustrates a one-piece wheel 47 with the non-integrated CTI valve 33, and cover plate 34 attached to the wheel 47 by a screw 36. FIG. 11 illustrates a three-piece wheel, consisting of an inner rim 13, an outer flange 44, and a lock-ring 45. (This alternate method also requires an L-seal 46 to seal the tire cavity). Moreover, though a specific integrated and non-integrated CTI valve are shown as an example in many of the figures, it is clear that this methodology could be applied to alternate CTI valves, so long as requirements for the specific mounting pattern and air passages were satisfied. And, while the two-piece wheel shown in many of the figures has the lug hole pattern residing on the outer rim 12, it is clear that this methodology could also be extended to a two-piece wheel with the lug hole pattern residing on the inner rim 13.

In addition, various features and functions disclosed above, or alternatives thereof, may be desirably combined into many other different systems or applications. Further, various presently unforeseen or unanticipated alternatives, modifications, variations or improvements therein may be subsequently made by those skilled in the art which are also intended to be encompassed by the claims when filed.

Finally, the following parts list for the drawing figures may be found to be of assistance in understanding more fully the concepts of our invention:

1 Two-Piece Wheel Assembly
2 Integrated CTI Valve
3 Two-Piece Wheel
4 Tire
5 Rim Portion of wheel
6 Disc Portion of wheel
7 Rim Flat Area
8 Hub Bore Area
9 Air Passage (Hub to Wheel)
10 Air Passage (Wheel to Tire)
11 Tire Chamber
12 Outer Rim
13 Inner Rim
14 Seal (0-ring between rim halves)
15 Stud
16 Nut
17 Fill Valve
18 Lug Hole
19 Enlarged Hole in outer rim
20 Threaded Insert
21 Mounting Hole (non-integrated CTI)
22 Mounting Hole (integrated CTI)
23 Internal Air Passage (integrated CTI)
24 Internal Air Passage (non-integrated CTI)
25 Non-integrated CTI Valve Assembly
26 Screw To Mount Non-integrated CTI Valve
27 Adapter
28 Sealing Washer
29 Port In Outer Rim
30 Hub Fitting
31 Clearance Hole
32 Fitting
33 Hose Assembly
34 Cover Plate
35 O-ring (Cover Plate)
36 Screw (Cover Plate Mounting)
37 Quick-Release Valve
38 Non-Integrated (External) CTI Valve
39 Screw (External CTI Mounting)
40 Seal (O-ring CTI Valve to Tire)
41 Seal (O-ring CTI Valve to Hub)
42 Seal (O-ring Outer Rim to Hub)
43 Plug
44 Outer Flange
45 Lock-Ring
46 L-seal
47 One-piece Wheel
48 Mounting Port
49 Opening for Stud

What is claimed is:

1. A wheel system for use with integrated and non-integrated central tire inflation systems, comprising:
a circular wheel rim having a flaring circumferential outer flange section formed coaxially on an outer end thereof and a flaring circumferential inner flange section formed coaxially on an inner end thereof, where said flange sections are both disposed to be engaged by beads of a tire mounted on the rim, with a transverse wall section intermediate said inner and outer ends extending transversely of an axis of said rim, said transverse wall section having an outer face and being adapted to connect to a vehicle wheel hub having a hub port for the passage of air;
wherein said wheel rim has a mounting port adapted for mounting an integrated central tire inflation valve, has an internal air passageway for connecting said hub port to said mounting port, and has a tire-side internal air passageway in communication with an interior of said tire for connecting said hub port to said tire interior; and
wherein said wheel rim has a clearance hole for connecting an external air passageway to said hub port, a rim port for connecting said external air passageway to an other tire-side internal air passageway in communication with the interior of said tire, and mounting sites for mounting a non-integrated central tire inflation system including a non-integrated central tire inflation valve.

2. A wheel system as described in claim 1, wherein said circular wheel rim is formed in pieces, including an outer rim piece and an inner rim piece, with said pieces being joined together by bolts inserted through overlapping portions of said outer rim piece and said inner rim piece such that one of the following is accessible for tightening at the outer face of said transverse wall section:
   a head of one of the bolts; and
   a nut placed on the head of the one of the bolts, one of said head and nut being accessible within a well in said face such that no portion of said nut and bolt combination extends beyond said well.

3. A wheel system as described in claim 2, further comprising an integrated central tire inflation valve mounted to said mounting port, and wherein said other tire-side internal air passageway is sealed.

4. A wheel system as described in claim 3, wherein said seal includes a plug sealing said rim port.

5. A wheel system as described in claim 2, further comprising a non-integrated central tire inflation valve system mounted to said wheel, and wherein said tire-side internal air passageway is sealed.

6. A wheel system as described in claim 5, wherein said non-integrated central tire inflation valve system includes at least one of a central tire inflation valve and a quick release valve flush mounted directly to said wheel.

7. A wheel system as described in claim 6, wherein said seal includes a plate sealing said mounting port.

8. A wheel system as described in claim 5, wherein said seal includes a plate sealing said mounting port.

9. A wheel system as described in claim 2, wherein said mounting port and clearance hole are located approximately 180 degrees apart on said wheel rim.

10. A wheel system as described in claim 1, further comprising an integrated central tire inflation valve mounted to said mounting port, and wherein said other tire-side internal air passageway is sealed.

11. A wheel system as described in claim 10, wherein said seal includes a plug sealing said rim port.

12. A wheel system as described in claim 1, further comprising a non-integrated central tire inflation valve system mounted to said wheel, and wherein said tire-side internal air passageway is sealed.

13. A wheel system as described in claim 12, wherein said non-integrated central tire inflation valve system includes at least one of a central tire inflation valve and a quick release valve flush mounted directly to said wheel.

14. A wheel system as described in claim 13, wherein said seal includes a plate sealing said mounting port.

15. A wheel system as described in claim 12, wherein said seal includes a plate sealing said mounting port.

16. A wheel system as described in claim 1, wherein said mounting port and clearance hole are located approximately 180 degrees apart on said wheel rim.

17. A wheel for use with integrated and non-integrated central tire inflation systems, the wheel comprising:
   an inner rim; and
   an outer rim connected to the inner rim, wherein the outer rim is configured for connection to a vehicle wheel hub having a hub port for the passage of air, wherein the outer rim defines:
      a first opening configured for receiving an integrated central tire inflation valve;
      a first internal air passageway configured for communicating air from the vehicle wheel hub to the integrated central tire inflation valve when the outer rim is connected to the vehicle wheel hub and the integrated central tire inflation valve is mounted to the outer rim;
      a second internal air passageway configured for communicating air from the integrated central tire inflation valve to an interior of a tire when the central tire inflation valve is mounted to the outer rim and the tire is mounted on the wheel;
      mounting holes for mounting a non-integrated central tire inflation valve system to the wheel;
      a second opening configured for receiving a first end of the non-integrated central tire inflation valve system, wherein the first end of the non-integrated central tire inflation valve system receives air from the vehicle hub port when the outer rim is connected to the vehicle wheel hub;
      a third opening configured for receiving a second end of the non-integrated central tire inflation valve system; and
      a third internal air passageway configured for communicating air from the second end of the non-integrated central tire inflation valve system to the interior of the tire when the tire is mounted on the wheel.

18. The wheel of claim 17, further comprising:
   a stud which passes through an opening defined by the inner rim and extends into a fourth opening defined by the outer rim; and
   a nut which is removably connected to the stud.

19. The wheel of claim 18, where neither the stud nor the nut extends completely through the fourth opening.

20. The wheel of claim 17, further comprising a seal positioned between the inner rim and the outer rim.

* * * * *